United States Patent [19]

Akiyama

[11] Patent Number: 4,475,746
[45] Date of Patent: Oct. 9, 1984

[54] SEAT OCCUPANT RESTRAINING STRAP OF VEHICULAR SEAT BELT ARRANGEMENT

[75] Inventor: Yoshinori Akiyama, Yokohama, Japan

[73] Assignee: Nissan Motor Company, Limited, Yokohama, Japan

[21] Appl. No.: 426,168

[22] Filed: Sep. 28, 1982

[30] Foreign Application Priority Data

Oct. 22, 1981 [JP] Japan .................................. 56-169205

[51] Int. Cl.³ ............................................... A62B 35/02
[52] U.S. Cl. ...................................... 280/808; 280/801
[58] Field of Search ............... 280/801, 802, 804, 808; 297/473, 482

[56] References Cited

U.S. PATENT DOCUMENTS 3,428,362  2/1969  Bertelson et al. .................... 280/801
3,959,855  6/1976  Fisher ................................... 280/808
4,244,601  1/1981  Nilsson ................................. 280/808

FOREIGN PATENT DOCUMENTS 2474413  7/1981  France .

Primary Examiner—Joseph F. Peters, Jr.
Assistant Examiner—Ross Weaver

[57] ABSTRACT

A restraining strap for use in a seat belt arrangement for an automotive vehicle wherein the restraining strap is to be spliced at one end thereof to an anchor bar which longitudinally extends in a fore-and-aft direction of the vehicle body and which is fixedly located adjacent a side end of the floor panel of the vehicle body, comprising an elongated flexible strip having an end portion turned back and joined to an adjacent portion of the strip and forming a loop portion adjacent the joined overlapping portions of the flexible strip; and a protective slide member received in the loop portion of the flexible strip and having a substantially semi-cylindrical base portion and a pair of wall portions extending from the base portion and spaced apart in parallel from each other.

11 Claims, 5 Drawing Figures

SEAT OCCUPANT RESTRAINING STRAP OF VEHICULAR SEAT BELT ARRANGEMENT

FIELD OF THE INVENTION

The present invention relates in general to a protective seat belt arrangement for use in an automotive vehicle to protect an occupant of a seat structure of the vehicle from an injury during a frontal collision of the vehicle. More specifically, the present invention relates to a flexible restraining strap to form part of such a vehicular protective seat belt arrangement.

SUMMARY OF THE INVENTION

In accordance with the present invention, there is provided a restraining strap for use in a seat belt arrangement for an automotive vehicle having a vehicle body structure including a floor panel wherein the restraining strap is to be spliced at one end thereof to an anchor bar which longitudinally extends in a fore-and-aft direction of the vehicle body structure and which is fixedly located adjacent a side end of the floor panel of the vehicle body structure, comprising in combination, an elongated flexible strip having, at the end of the restraining strap at which the restraining strap is to be spliced to the anchor bar, an end portion turned back and joined to an adjacent portion of the strip and forming a loop portion adjacent the joined overlapping portions of the flexible strip; and a protective slide member received in the loop portion of the flexible strip and having a substantially semi-cylindrical base portion and a pair of wall portions extending from the base portion and spaced apart substantially in parallel from each other.

BRIEF DESCRIPTION OF THE DRAWINGS

The drawbacks of a prior-art restraining strap of a seat belt arrangement and the features and advantages of a seat belt arrangement according to the present invention will be more clearly understood from the following description taken in conjunction with the accompanying drawings in which.

DESCRIPTION OF THE PRIOR ART

Figure 1:
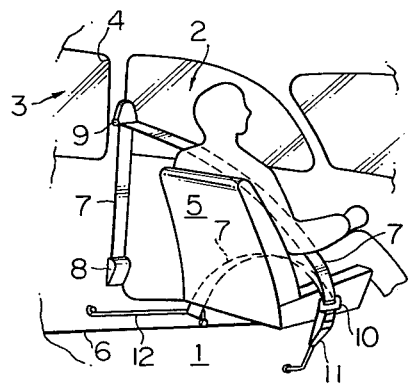
FIG. 1 is a schematic perspective view showing a known protective seat belt arrangement provided in an automotive vehicle.

Referring to FIG. 1 of the drawings, a prior-art protective seat belt arrangement of the nature to which the present invention generally appertains is shown provided in an automotive vehicle having a vehicle body structure including a floor panel 1, a front door structure 2, a rear door structure 3, a center pillar 4, a front seat structure 5 and a side sill 6. The center pillar 4 forms part of the vehicle body structure and is located between the front and rear door structures 2 and 3 and endwise extends vertically between a roof side rail and the side sill 6 extending along each side edge of the floor panel 1. The side sill 6 also forms part of the vehicle body structure and extends in a fore-and-aft direction of the vehicle body structure in the vicinity of the outer side of the seat cushion of the seat structure 5. The seat structure 5 is shown occupied by an occupant D.

In the vehicle body structure thus constructed, the prior-art protective seat belt arrangement comprises a flexible main or outer restraining strap 7 which endwise extends from a lockable strap retractor unit 8 upwardly to a through anchor unit 9 and which is slidably passed through the anchor unit 9. The strap retractor unit 8 and the through anchor unit 9 are mounted on the center pillar 4 and are thus located adjacent one side of the seat structure 5. Past the through anchor unit 9, the restraining strap 7 endwise extends obliquely over the seat cushion of the seat structure 5 downwardly toward the other side of the seat structure 5 and is spliced at its leading end to a buckle 10. A block retainer 11 anchored at one end to the floor panel 1 is releasably tied to the buckle 10 and, thus, has the main restraining strap 7 retained to the vehicle body structure through the buckle 10. The restraining strap 7 is slidably passed through the buckle 10 and is spliced at its leading end to an anchor bar 12. The anchor bar 12 longitudinally extends in a fore-and-aft direction of the vehicle body structure and is fixedly connected at the opposite ends thereof to the above mentioned side sill 6. As illustrated partially and to an enlarged scale in FIG. 2 of the drawings, the anchor bar 12 has a front end portion 13 arcuately curved downwardly and is formed with an aperture 14 through which a bolt (not shown) is driven into the side sill 6 to have the anchor bar 12 secured to the vehicle body structure. The restraining strap 7 has, at its leading end spliced to the anchor bar 12, an end portion turned back and stitched to an adjacent portion of the strap 7 as indicated at 15 in FIG. 2 and forms a loop portion 16. The restraining strap 7 is spliced to the anchor bar 12 through this loop portion 16 and is thus slidable on and along the anchor bar 12. The restraining strap 7 is formed of braided fabric. When the vehicle encounters a frontal collision and the occupant D of the seat structure 5 is flung forwardly thereon, the restraining strap 7 is stretched and forced also forwardly so that the loop portion 16 thereof is moved to the curved end portion 13 of the anchor bar 12 as indicated by dots-and-dash lines in FIG. 2.

The prior-art seat belt arrangement of the above described nature has various drawbacks to be eliminated. One of these drawbacks is that the anchor bar 12 is located on the outer side of the seat structure 5 and is liable to be soiled with dirt when a passenger of the vehicle is leaving the vehicle or an intending passenger is entering the vehicle. If the dirt deposited on the anchor bar 12 happens to be transferred to the restraining strap 7 which is formed of braided fabric as above mentioned and which has its loop portion 16 directly contacted by the anchor bar 12, it is difficult to have the restraining strap 7 cleaned of the dirt perfectly. If the loop portion 16 of the restraining strap 7 is thus left mired, the loop portion 16 could not slide smoothly on the anchor bar 12 and would impede endwise movement and deformation of the restraining strap 7 as a whole. When, furthermore, the loop portion 16 of the restraining strap 7 is moved to the curved end portion 13 of the anchor bar 12 during a frontal collision of the vehicle as above discussed, the loop portion 16 produces wrinkles therein as indicated at 17 in FIG. 2. The restraining strap 7 being stretched forcefully during the collision of the vehicle, the wrinkles formed in the loop portion 16 of the restraining strap 7 are left behind and would impede the loop portion 16 of the restraining strap 7 in smoothly moving on the anchor bar 12. Another drawback of the prior-art seat belt arrangement described above is that the loop portion 16 of the restraining strap 7 tends to wear and fray early since the loop portion 16 is directly contacted by the anchor bar 12. The present invention contemplates elimination of these drawbacks inherent in a known restraining strap of a seat belt arrangement of the described nature.

DESCRIPTION OF THE PREFERRED EMBODIMENTS

Figure 2:
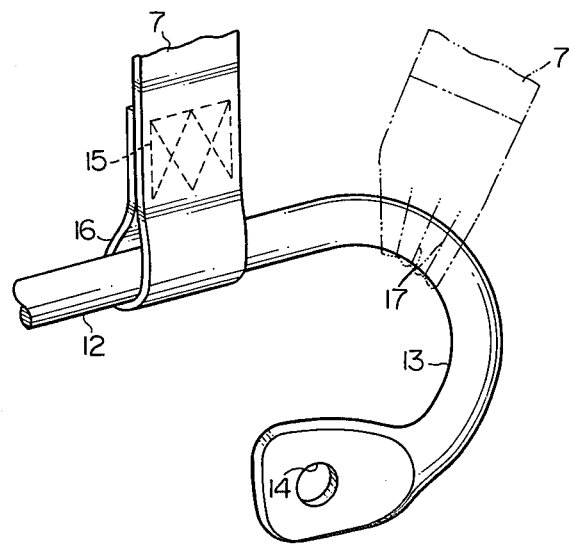
FIG. 2 is a fragmentary perspective view showing portions of a restraining strap and an anchor bar forming part of the seat belt arrangement illustrated in FIG. 1.
Figure 3:
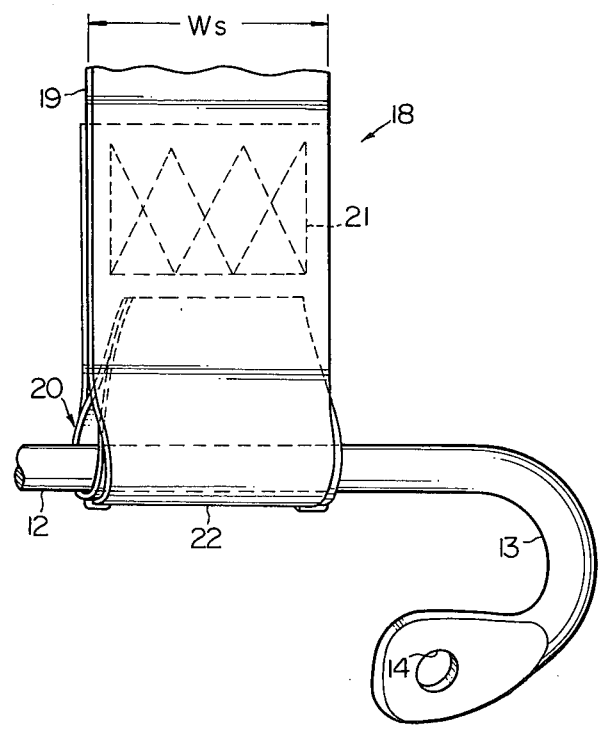
FIG. 3 is a fragmentary perspective view showing portions of a restraining strap embodying the present invention and an anchor bar provided in association of the restraining strap in a seat belt arrangement using the strap.

Referring to FIG. 3 of the drawings, a restraining strap embodying the present invention is designated by reference numeral 18 and is shown provided in combination with an anchor bar 12 which is similar to its counterpart in the prior-art seat belt arrangement described with reference to FIGS. 1 and 2. Thus, the anchor bar 12 longitudinally extends in a fore-and-aft direction of the vehicle body structure and is fixedly located adjacent a side end of the floor panel (not shown) of the vehicle body structure of an automotive vehicle. The anchor bar 12 has a front end portion 13 arcuately curved downwardly and is formed with an aperture 14 through which a suitable fastening element such as a bolt (not shown) is driven into a suitable structural member (not shown) of the vehicle body structure so as to have the anchor bar 12 secured to the vehicle body structure.

Figure 4:
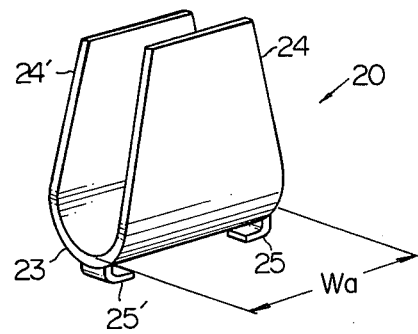
FIG. 4 is a perspective view showing a slide member forming part of the restraining strap shown in FIG. 3.

The restraining strap 18 embodying the present invention comprises an elongated flexible strip 19, and a protective slide member 20 securely attached to the flexible strip 19. The flexible strip 19 per se is similar to the prior-art restraining strap 7 of the seat belt arrangement described with reference to FIGS. 1 and 2 and has, at the end of the restraining strap 18 at which the restraining strap 18 is to be spliced to the anchor bar 12, an end portion turned back and stitched or otherwise joined to an adjacent portion of the strip 19 as indicated at 21 in FIG. 3 for forming a loop portion 22 adjacent the stitched or otherwise joined overlapping portions of the flexible strip 19. The slide member 20 is adapted to be received in the loop portion 22 of the strip 19. The restraining strip 19 is spliced to the anchor bar 12 through this loop portion 22 and is thus slidable on and along the anchor bar 12. The restraining strip 19 is formed of, for example, braided fabric. On the other hand, the slide member 20 has a U-shaped cross section and consists of a semi-cylindrical base portion 23 and a pair of wall portions 24 and 24' extending from the base portion 23 and spaced apart in parallel from each other as shown in FIG. 4 of the drawings. The loop portion 22 of the flexible strip 19 in the embodiment shown in FIG. 3 has a width Ws which is uniform throughout the extent of the loop portion 22. The width (represented by Wa in FIG. 4) of the base portion 23 of the slide member 20 is slightly larger than the width Ws of the flexible strip 19. Furthermore, the wall portions 24 and 24' of the slide member 20 are gradually reduced in width toward their respective ends opposite to the base portion 23. The slide member 20 further has on the curved outer surface of the base portion 23 a pair of clip portions 25 and 25' which are located adjacent the opposite lateral ends, respectively, of the base portion 23. The clip portions 25 and 25' are each in part spaced apart from the curved outer surface of the base portion 23 a distance approximately equal to the thickness of the flexible strip 19 and are directed toward each other. The slide member 20 thus configured is preferably constructed of a synthetic resin and is attached, either fixedly or releasably, to the loop portion 22 of the flexible strip 19 with the outer surfaces of the base portion 23 and wall portions 24 and 24' attached to the inner surface of the loop portion 22 of the flexible strip 19 and with the loop portion 22 of the strip 19 clipped by the clip portions 25 and 25' adjacent opposite lateral ends of the loop portion 22.

The restraining strap 18 constructed by the flexible strip 19 and the slide member 20 as above described is spliced to the anchor bar 12 in such a manner that the curved inner surface of the semi-cylindrical base portion 23 of the slide member 20 slidably receives the anchor bar 12 as shown in FIG. 3. When the restraining strap 18 is forced to move along the anchor bar 12 during, for example, a frontal collision of the vehicle, the base portion 23 of the slide member 20 is caused to slide on the anchor bar 12. Throughout such movement of the restraining strap 18 with respect to the anchor bar 12, the flexible strip 19 is not required to partake in sliding movement on the anchor bar 12 with the slide member 20 so that the restraining strap 18 is permitted to smoothly move on and along the anchor bar 12. If, furthermore, the anchor bar 12 happens to be soiled with dirt, the flexible strip 19 which is not directly contacted by the anchor bar 12 is kept from being contaminated with the dirt on the anchor bar 12 although the dirt on the anchor bar 12 would be transferred to the slide member 20. If dirt is thus transferred from the anchor bar 12 to the slide member 20, the slide member 20 constructed of a synthetic resin as above noted can be easily and thoroughly cleaned of the dirt and is permitted to smoothly slide on the anchor bar 12. If, on the other hand, the loop portion 22 of the flexible strip 19 is moved to the arcuately curved end portion 13 of the anchor bar 12 due to the tension produced in the flexible strip 19 during a frontal collision of the vehicle, the loop portion 22 is engaged by the curved portion 13 through the slide member 20 and is for this reason prevented from producing wrinkles which would otherwise be produced therein as previously discussed. The loop portion 22 of the flexible strip 19 being not directly contacted by the anchor bar 12, furthermore, the loop portion 22 is protected from being worn and frayed earlier.

Figure 5:
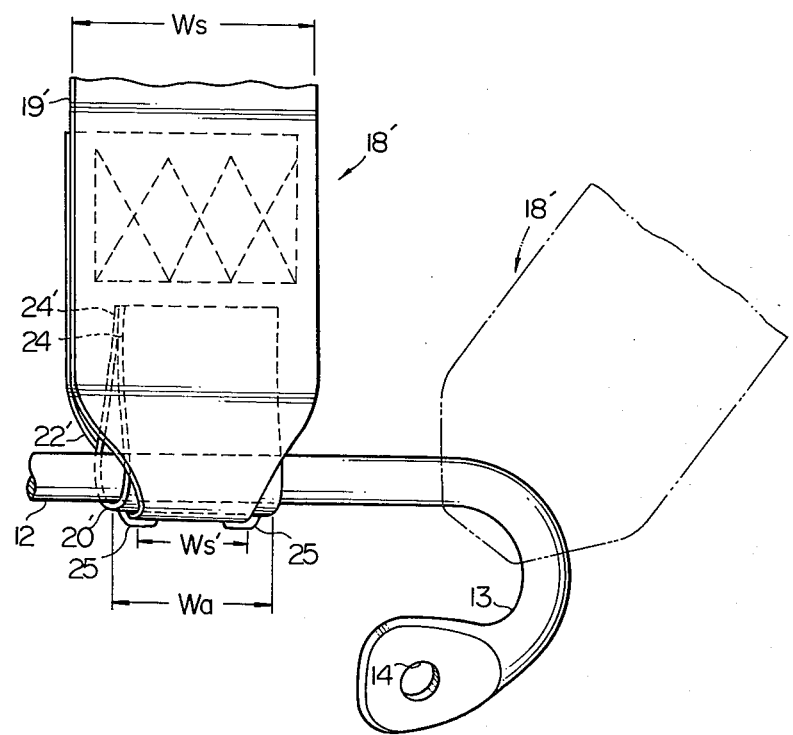
FIG. 5 is a view similar to FIG. 3 but showing a modification of the restraining strap illustrated in FIG. 3.

While the loop portion 22 of the flexible strip 19 in the above described embodiment of the present invention has a uniform width, the flexible strip 19' forming part of a restraining strap 18' shown in FIG. 5 has a loop portion 22' which is reduced in width toward its end opposite to the joined overlapping portions of the flexible strip 19'. In this instance, the width Wa of the slide member 20' is larger than the width (represented by Ws') of the reduced end of the loop portion 22', viz., the minimum width Ws' of the loop portion 22' and, accordingly, the clip portions 25 and 25' of the slide member 20' are spaced shorter apart from each other than are their counterparts of the slide member 20 in the embodiment of FIG. 3. In the embodiment of FIG. 5, furthermore, the parallel wall portions 24 and 24' of the slide member 20' have uniform widths as shown. The embodiment of the restraining strap 18' thus constructed is advantageous over the embodiment of FIGS. 3 and 4 in that the sliding friction applied to the slide member 20' is reduced and in that the slide member 20' is enabled to slide on the curved end portion 13 of the anchor bar 12 more smoothly than the slide member 20' of the first embodiment.

What is claimed is:

1. In a seat belt arrangement for an automotive vehicle having a vehicle body structure including a floor panel, the combination of an anchor bar which longitudinally extends in a fore-and-aft direction of the vehicle body structure and which is fixedly located adjacent a side end of the floor panel of the vehicle body structure, the anchor bar having a front end portion arcuately curved downwardly, and a restraining strap which is spliced at one end thereof to said anchor bar, the restraining strap comprising, an elongated flexible strip having an end portion turned back and joined to an adjacent portion of the strip and forming a loop portion adjacent the joined overlapping portions of the flexible strip; and a protective slide member received in said loop portion of said flexible strip and having a substantially semi-cylindrical base portion and a pair of wall portions extending from the base portion and spaced apart substantially in parallel from each other, the base portion of the slide member having its inner surface slidably received on said anchor bar so that the slide member is slidable with said loop portion of the flexible strip on and along the anchor bar.

2. The combination as set forth in claim 1, in which the loop portion of said flexible strip has a substantially uniform width.

3. The combination as set forth in claim 2, in which the base portion of said slide member has a width which is larger than the width of the loop portion of said flexible strip.

4. The combination 18 as set forth in claim 3, in which said wall portions of the slide member are gradually reduced in width toward their respective ends opposite to the base portion of the slide member.

5. The combination strap as set forth in claim 1, in which the loop portion of said flexible strip is reduced in width toward its end opposite to the joined overlapping portions of the flexible strip.

6. The combination as set forth in claim 2, in which the base portion of said slide member has a width which is larger than the minimum width of the loop portion of said flexible strip.

7. The combination as set forth in claim 3, in which said wall portions of the slide member have substantially uniform widths.

8. The combination as set forth in any one of claims 1 to 7, in which said slide member further has on the curved outer surface of the base portion thereof a pair of clip portions which are located adjacent the opposite lateral ends, respectively, of the base portion, the clip portions being each in part spaced apart from the curved outer surface of the base portion a distance substantially equal to the thickness of the flexible strip and being directed toward each other for being capable of clipping said loop portion of the flexible strip adjacent the opposite lateral ends, respectively, of the loop portion.

9. The combination as set forth in any one of claims 1 to 7, in which said restraining strip is formed of braided fabric.

10. The combination as set forth in any one of claims 1 to 7, in which said slide member is constructed of a synthetic resin.

11. A combination as set forth in any one of claims 1 to 7, in which the base portion of said slide member has an inner surface having a cross section partially conforming to the cross section of said anchor bar.

* * * * *